Figure 1:
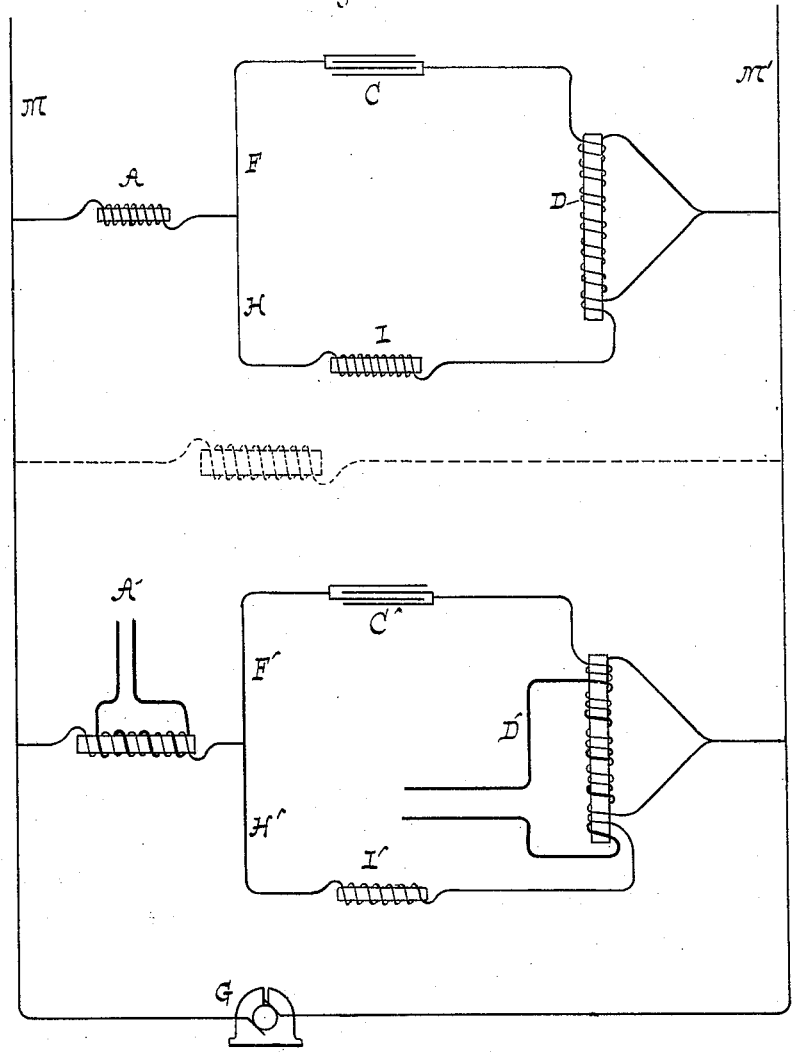

(No Model.) 5 Sheets—Sheet 3.
C. S. BRADLEY.
PRODUCTION OF DISPLACED PHASES AND ROTARY FIELDS.
No. 546,756. Patented Sept. 24, 1895.

Witnesses
J. Landsing
E. C. Grigg.

Inventor
Charles S. Bradley.
By his Attorney

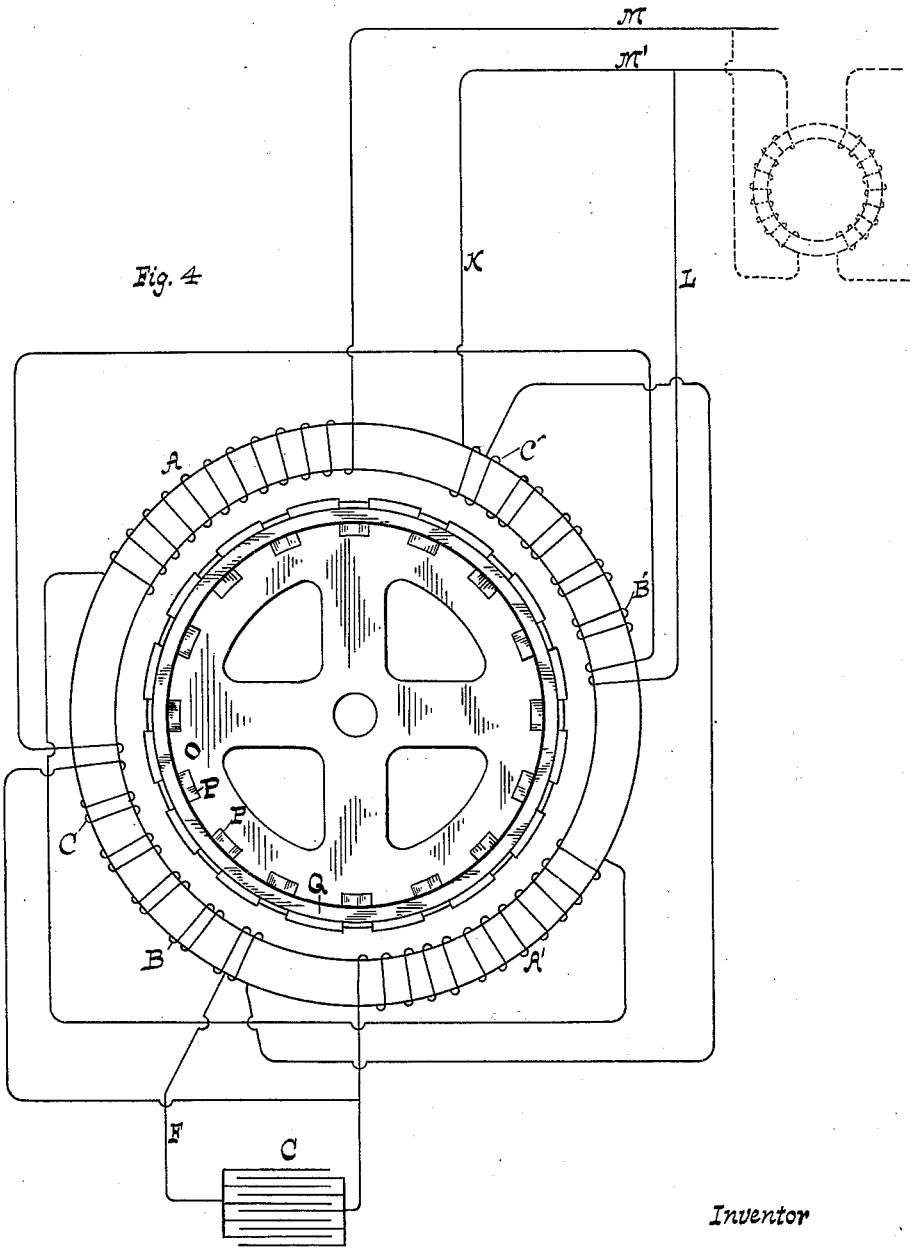

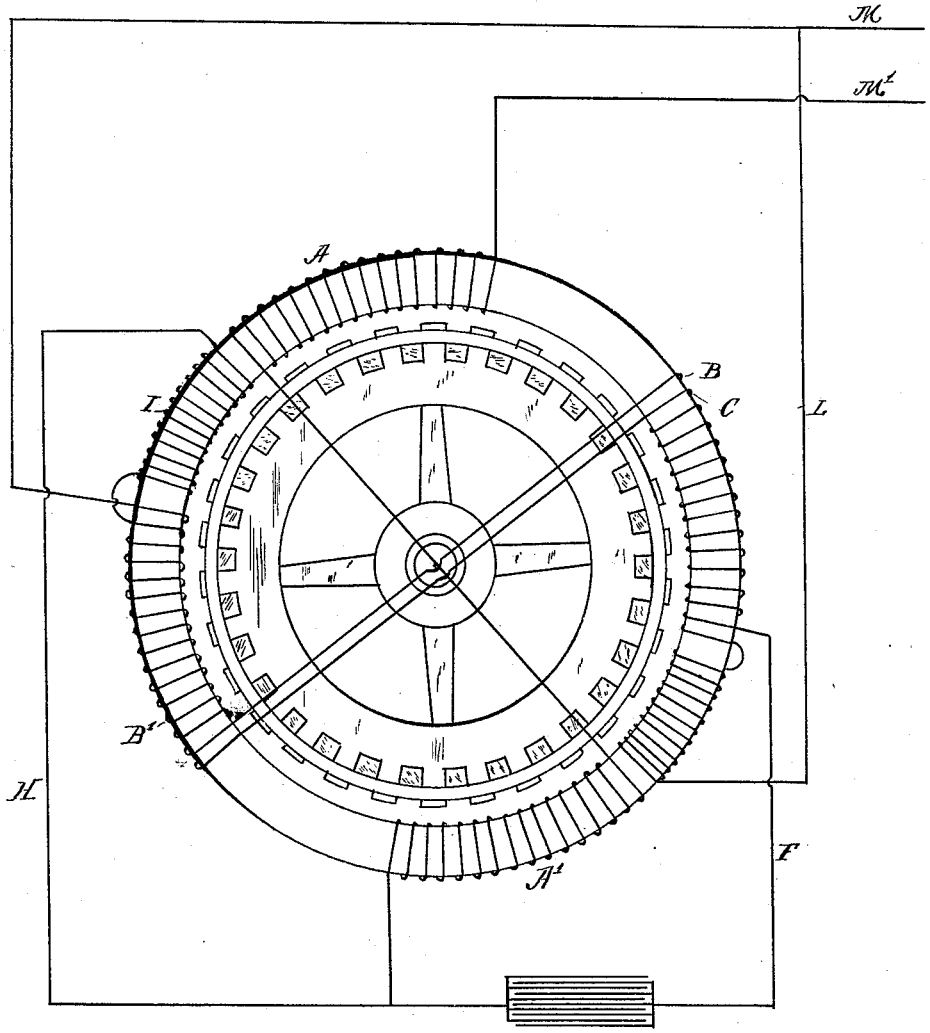

UNITED STATES PATENT OFFICE.

CHARLES S. BRADLEY, OF AVON, NEW YORK.

PRODUCTION OF DISPLACED PHASES AND ROTARY FIELDS.

SPECIFICATION forming part of Letters Patent No. 546,756, dated September 24, 1895.

Application filed December 24, 1894. Serial No. 532,791. (No model.)

*To all whom it may concern:*

Be it known that I, CHARLES S. BRADLEY, a citizen of the United States, residing in Avon, in the county of Livingston and State of New York, have invented certain new and useful Improvements in Means for Developing Displaced Magnetic Phases and Producing Rotary Magnetic Fields, of which the following is a specification.

This invention is especially designed to develop rotary magnetic fields from a single-phase alternating current with a view to transmission of power efficiently over a single pair of conducting-mains. Rotary magnetic fields are now commonly developed by the employment of two or more alternating currents having proper phase differences. Motors may be efficiently operated by such systems, and such motors are not only self-starting, but increase in torque with increase of load. Such systems, however, for efficient operation require three or more line-wires, for the reason that no means have been at hand for developing a rotary magnetic field by a single alternating current.

In carrying out my invention I employ two harmonic magneto-motive forces differing by a quarter-period in phase. I obtain these by the use of two coils, one simple and the other compound, which may be wound either on the motor or adjacent thereto and which are fed in series by the same alternating current. If the coils are in the motor, they are wound directly upon the magnetic core, which is the better arrangement; if adjacent thereto they form the primaries of two transformers, the secondaries being used in the motor-windings. The compound coil is wound in a peculiar manner. Two wires are preferably wound together on an iron core, the last end of one being joined to the first end of the other, so that should a current be sent through them from end to end both would co-operate to magnetize the core in one direction; but if a current is sent in *via* the connecting-wire, the current splitting into two equal parts and passing out by the ends, or vice versa, a differential effect is produced and no magnetism results. In my invention in series with one wire of the compound coil I place a condenser or other phase-advancing device, and when the inductance of the other wire within the compound coil is not sufficient I place inductance external thereto. This, however, is not generally necessary, as we have a condition of resonance, or approaching it, so that by adjusting the condenser to the proper capacity we obtain the desired result. Thus, when the two branches of the divided circuits are properly proportioned as to capacity and inductance, there is developed in the compound coil a magneto-motive force resulting from the current or currents flowing therein differing from the magneto-motive force of the simple coil by a quarter-period displacement. It is evident that if the two coil systems be properly spaced upon a core a rotary magnetic field may be developed and utilized for producing any number of currents of different phase in a transformer or utilized with an armature provided with a closed coil to form an efficient single-phase alternating-current motor.

My invention therefore comprises means for producing a definite displacement of magneto-motive force, consisting in leading current through a compound coil connected with a condenser or other phase-advancing device and an inductance.

My invention also comprises means for producing a rotary magnetic field, consisting of a compound coil and a simple coil suitably spaced on a ring or drum core, the compound coil including a condenser in circuit with it to produce a definite displacement of magneto-motive force in the core which it surrounds.

The invention also comprises other features of novelty, which will be more particularly hereinafter explained, and which will be definitely indicated in the claims appended to this specification.

Figure 2:
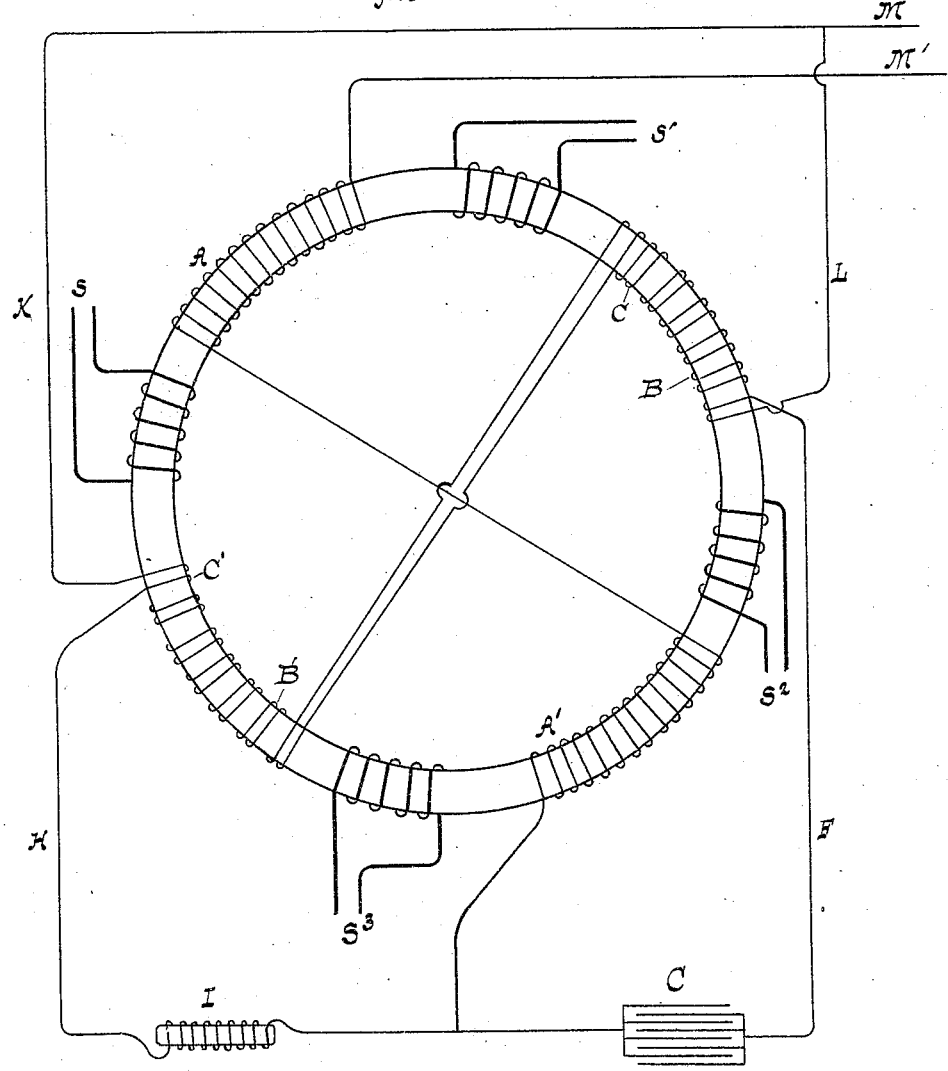
Figure 3:
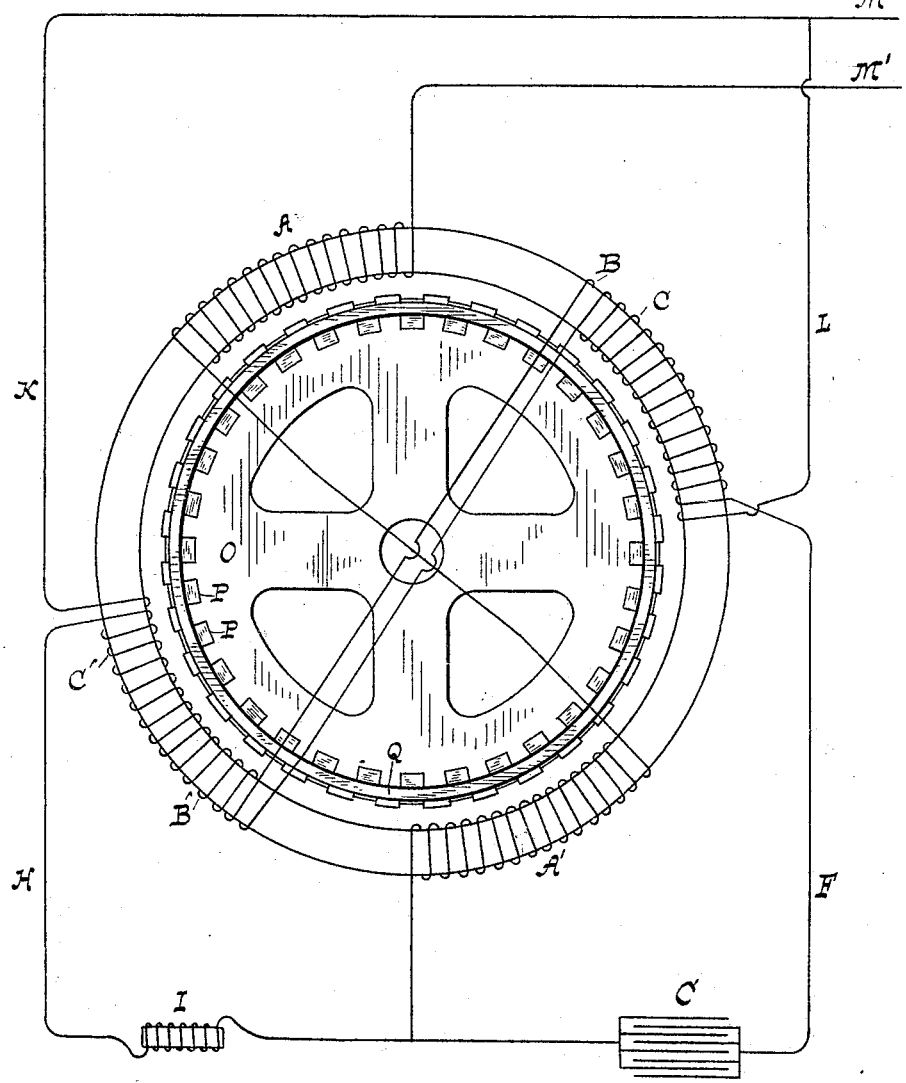

In the accompanying drawings, which illustrate my invention, Figure 1 is a diagram showing a compound coil in connection with a capacity and inductance arranged so as to make the magneto-motive force of the compound coil differ in phase ninety degrees from that in the simple coil in the supply-circuit. Fig. 2 is a diagram of a transformer in which a rotary magnetic field is developed from a simple alternating current by means of two magneto-motive forces differing in phase by a quarter-period obtained in two coils, one simple and the other compound. Fig. 3 is a diagram of a motor operative from a simple alternating circuit, and Figs. 4 and 5 are modified forms of motor.

In Fig. 1, G represents a source of alternating current, C a capacity, and I an inductance employed in parallel relation to the circuit, the two leading through a compound coil D, surrounding an iron core, and then passing back to the generator. It will be seen that the two branches are in differential relation in the compound coil. In this organization current arriving at the compound coil will be divided into two components, one of which—that through the capacity—will lead the supply-current by ninety degrees in phase, and the other—through the inductance—will lag behind the supply-current by ninety degrees in phase, provided suitable adjustment of the capacity and inductance be made. The combined effect of these two components in the compound coil will be that its magneto-motive force will differ by a quarter-period in phase from any coil in the supply-circuit in series with this combination, for since one component leads ninety degrees and one component lags ninety degrees they will be one hundred and eighty degrees apart or in series relation with respect to each other and the two windings of the compound coil, and the phase of magneto-motive force of the coil, as stated above, will be ninety degrees behind the magneto-motive force of the simple coil. If through change of load a decrease of lag should occur in the inductance branch, a similar decrease of lead will occur in the capacity branch. Now, if the lag should decrease to eighty degrees the lead would also decrease to about eighty degrees; but with respect to the compound coil this lead of eighty degrees acts the same as one hundred degrees lag, due to the manner in which the connections are made. Hence the resultant magneto-motive force will still lag ninety degrees, as before, for the resultant of two components, one of eighty degrees and the other of one hundred degrees lag, is ninety degrees lag. Furthermore, the mutual induction of the two windings of the compound coil will tend to prevent any departure from the one-hundred-and-eighty-degrees phase relation between the currents in the two branches. This compound coil may be used either as the primary of a transformer or as one set of coils of a rotary field-motor.

In the lower part of Fig. 1, A' D' represent secondary circuits taken from cores A and D, respectively, and since the magneto-motive forces in the cores are ninety degrees apart the secondary currents will differ by a quarter-period in phase.

In Fig. 2 is exemplified a transformer in which a rotary field is developed by an application of the principles just set forth. M M' represent two supply-wires fed by a source of a simple alternating current. One of these wires leads to coils A A' on the transformer-core. The circuit after leaving the winding A A' divides, one branch passing through a condenser C and the other branch through a reaction-coil I, the first branch leading through branches B B' of the compound coil on the transformer, and the second branch leading through a coil C C' in the same inductive relation to the transformer-core as the coils B B' and differentially connected with respect to the latter. The terminals of these two branches connect with the main line. The compound coil is placed ninety degrees distant on the core from the coils A A'. The current, as we have seen, flowing over the local circuit C I H F K L and compound coil forming the coil system B B' C C' will develop a magneto-motive force ninety degrees from the magneto-motive force in the coil system A A', and thus a rotary field will be produced in the core of the transformer in a manner well understood. Upon the core may be wound secondary circuits S S' S² S³, from which induced alternating currents of the required tension and phase displacement may be derived. These may be employed for any desired work. Evidently if an iron armature provided with a closed circuit be mounted within the core a motor will be produced. Such an organization is shown in Fig. 3, where the laminated armature O is provided with copper bars P, set in peripheral grooves and electrically connected at the ends by conducting-rings Q in a manner well understood. Instead of employing an auxiliary inductance, such as the reaction-coil I, the motor or transformer winding may itself be employed as the inductance and produce a resultant wave of the desired displacement. Such an organization is exemplified in the rotary field-motor shown in Fig. 4, where the current leads from the main line or from a transformer, as indicated in dotted lines, through the motor-circuit A A', and thence by direct connection into the motor-circuit C'. In such an organization the inductance will be furnished by the motor and its winding. The two parts of the compound coil being wound side by side in intimate inductive relation to the core have a strong mutual induction. Any tendency to a stronger current flow in one than in the other of the differential coils will cause a mutual reaction, which steadies the phase displacement of the magneto-motive force in the core. Moreover, since this is a magneto-motive-force displacement in the core of the inductance I, which is intermediate between the magneto-motive force of the simple and compound coils, respectively, in some organizations, I place the inductance or an equivalent thereof on the core in an intermediate position between the simple and compound coils, as shown in Fig. 5. The coil system A A' might be placed in parallel with the compound circuit, as indicated in dotted lines in Fig. 1. With this organization, however, in order to produce a quarter-period displacement between the magneto-motive force in the coil A and the coil D the capacity and inductance should be so combined as to produce a magneto-motive-force-phase displacement in coil D of more than ninety degrees to compensate for the lag in coil A.

Having thus described my invention, what I claim as new, and desire to secure by Letters Patent, is—

1. As a means of producing a definite displacement of magneto motive force in a core a compound coil substantially as described in combination with a phase advancing device.

2. As a means of producing a definite displacement of magneto-motive force in a core, a compound coil substantially as described in combination with a condenser and an inductance in its branches.

3. As a means of producing currents of relatively displaced phases a coil influenced by line current and a coil whose current phases are a resultant of two branch currents passing through a condenser and inductance respectively.

4. As a means of producing currents of relatively displaced phases a coil influenced by line current and a compound coil substantially as described containing in its branches a condenser and an inductance.

5. As a means of producing currents of relatively displaced phases, a simple coil and a compound coil substantially as described having two branches containing respectively a condenser and inductance each in series relation to the simple coil.

6. As a means of producing a rotary magnetic field, a compound coil and a simple coil suitably spaced on a ring or drum core, the compound coil having a condenser in series therewith to produce a displaced magneto motive force relatively to that of the simple coil.

7. As a means of producing a rotary magnetic field, a compound coil and a simple coil suitably spaced on a ring or drum core, the compound coil being connected in two branch circuits containing an inductance and condenser adjusted to produce a definite displacement of magneto motive force.

8. As a means of producing a rotary magnetic field, a compound coil and a simple coil suitably spaced on a ring or drum core, the compound coil having two members in parallel relation to the supply circuit differentially wound and in the same inductive relation to the core and containing respectively inductance and capacity to produce the required phase displacement of magneto motive force relatively to that produced by the simple coil.

9. As a means of producing a rotary magnetic field, a compound coil and a simple coil suitably spaced on a ring or drum core and connected in series relation, the compound coil comprising two members in parallel relation differentially wound and in the same inductive relation to the core and containing respectively inductance and capacity to produce a displacement of phase of magneto motive force to correspond to the angular displacement on the core.

10. As a means of producing a rotary magnetic field, a compound coil and a simple coil spaced ninety degrees apart on a ring or drum core and connected in series relation, the compound coil comprising two members in parallel relation differentially wound and in the same inductive relation to the core, and containing respectively inductance and capacity to produce a phase displacement of magneto motive force of ninety degrees with reference to the simple coil.

In testimony whereof I have hereunto subscribed my name this 22d day of December, 1894.

CHARLES S. BRADLEY.

Witnesses:
WM. V. HEAPHY,
THOS. B. C. YEARLEY.